US009602775B2

(12) United States Patent
Barnett, Jr.

(10) Patent No.: US 9,602,775 B2
(45) Date of Patent: Mar. 21, 2017

(54) AUTO DISCOVERY AND AUTO PROVISIONING OF SET TOP BOXES

(75) Inventor: Thomas C. Barnett, Jr., Atchison, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1667 days.

(21) Appl. No.: 12/437,267

(22) Filed: May 7, 2009

(65) Prior Publication Data

US 2010/0287582 A1    Nov. 11, 2010

(51) Int. Cl.
| H04N 7/16 | (2011.01) |
| H04N 7/173 | (2011.01) |
| H04L 12/24 | (2006.01) |
| H04N 21/258 | (2011.01) |
| H04N 21/443 | (2011.01) |
| H04N 21/6334 | (2011.01) |
| H04N 21/81 | (2011.01) |
| H04L 29/06 | (2006.01) |

(52) U.S. Cl.
CPC ..... H04N 7/17318 (2013.01); H04L 41/0806 (2013.01); H04L 41/12 (2013.01); H04N 21/25808 (2013.01); H04N 21/4432 (2013.01); H04N 21/63345 (2013.01); H04N 21/818 (2013.01); H04L 63/102 (2013.01)

(58) Field of Classification Search
CPC ....... H04N 21/25808; H04N 21/25816; H04N 21/4432
See application file for complete search history.

(56) References Cited

U.S. PATENT DOCUMENTS

| 2002/0059619 | A1 | 5/2002 | Lebar |
| 2003/0070170 | A1 | 4/2003 | Lennon |
| 2003/0182665 | A1* | 9/2003 | Kwon ........................... 725/111 |
| 2007/0074240 | A1* | 3/2007 | Addington et al. ............ 725/25 |
| 2007/0174886 | A1* | 7/2007 | Scheuer ........... H04N 21/25866 725/110 |
| 2007/0250863 | A1* | 10/2007 | Ferguson ........................ 725/46 |
| 2007/0282846 | A1* | 12/2007 | Goodwill et al. .............. 707/10 |
| 2008/0117902 | A1* | 5/2008 | Vinneras ....................... 370/389 |
| 2008/0118231 | A1* | 5/2008 | Guzman ............ H04N 21/2541 386/248 |
| 2008/0168524 | A1* | 7/2008 | Wood et al. .................. 725/134 |

(Continued)

Primary Examiner — Brian T Pendleton
Assistant Examiner — Dika C. Okeke
(74) Attorney, Agent, or Firm — Swanson & Bratschun, L.L.C.

(57) ABSTRACT

A system and method for the automatic discovery and provisioning of a video set top box within an IPTV network is provided. When first connected to a residential gateway, the set top box requests the address information of the residential gateway. The set top box then sends a request to a video operations and support server (VOSS) with the identifying information for the set top box and the residential gateway. Once the VOSS determines that the residential gateway is authorized for video service, the VOSS associates the residential gateway with the set top box. The VOSS then communicates the authorization to a middleware server, which downloads client software and encryption keys to the set top box, enabling the set top box to request and receive video content. The set top box may be reconnected to any port on the residential gateway and receive video service without being re-provisioned.

20 Claims, 3 Drawing Sheets

(56) References Cited

U.S. PATENT DOCUMENTS

| | | | |
|---|---|---|---|
| 2009/0089882 A1* | 4/2009 | Hofmann | H04N 21/4623 726/28 |
| 2009/0100465 A1* | 4/2009 | Kulakowski | H04N 21/2355 725/37 |
| 2009/0100490 A1* | 4/2009 | Nandhakumar | 725/114 |
| 2009/0300673 A1* | 12/2009 | Bachet et al. | 725/31 |
| 2010/0015912 A1* | 1/2010 | Tucker | H04N 7/181 725/25 |
| 2010/0064324 A1* | 3/2010 | Jenkin | H04N 21/443 725/59 |
| 2010/0083335 A1* | 4/2010 | Talbert | 725/131 |
| 2010/0146534 A1* | 6/2010 | Chen et al. | 725/25 |
| 2013/0326017 A1* | 12/2013 | Issa | 709/217 |

\* cited by examiner

AUTO DISCOVERY AND AUTO PROVISIONING OF SET TOP BOXES

TECHNICAL FIELD OF THE INVENTION

The present disclosure relates generally to delivery of in-home video services, and in particular, to an improved system and method for auto-discovery and auto-provisioning of set top boxes.

BACKGROUND OF THE INVENTION

The in-home wiring and installation of video services for a new customer is a labor intensive process. With advent of internet protocol television (IPTV), this process is made more complicated due the various pieces of equipment that have to be configured by the installer in the customer's home. Because much of the intermediate equipment involved is software-based, the configuration of such equipment has become more difficult, adding to the installer time and knowledge required to perform an installation. In addition, many companies are now providing customers with telephone, internet, and video (TV) services all in one package.

In order to provide the different services, and to minimize the types of equipment required, a device known as a residential gateway (RG) is normally installed in the customer's home. Because all of the services are being transmitted to the customer over the internet, the RG serves as the connection point between the various internet-provided services and the individual devices in the customer's home that require the services. The individual devices normally comprise personal computers (for internet browsing), telephones, and one or more television set-top boxes for television viewing.

To complete an installation, the installer must normally configure the residential gateway device before connecting any of the downstream customer equipment. Various standardized protocols and methods are known in the art for automatically configuring residential gateways so that the installer does not have to perform the operation manually. In addition to the gateway, however, the set top boxes which provide video services to televisions in the house also need to be configured. Because IPTV often involves "upstream" data requests from the set top box to initiate reception of a particular program (as opposed to general broadcast TV), the configuration of the set top boxes can be quite complicated and time consuming for the installer.

Unfortunately, prior art methods for automatically provisioning gateways and other customer premises equipment are lacking in a number of respects. For example, U.S. Patent Application Publication No. US 2008/0117902 A1 to Vinneras describes a bridged-ethernet residential gateway unit which uses a dedicated virtual local area network (VLAN) for each device (i.e., phones, TVs, computers) being connected to the gateway. However, the gateway unit of Vinneras operates only at the Ethernet (Layer 2) level and does not perform any Internet Protocol (IP Layer 3) routing functions. Because of this, the gateway cannot perform network address translation (NAT) and cannot "hide" the address details of the set top box, telephone, or personal computer from the outside network, causing an increased security risk. The ability to remotely troubleshoot problems with the individual devices connected to the gateway is also limited.

In addition, the installer must still manually configure the television set top box if any interactive IPTV features are to be enabled. This is typically done by manually inputting the appropriate system equipment identifiers of the set top box, such as internet protocol (IP) addresses, media access control (MAC) addresses, and globally unique identifiers (GUIDs), into the system. The manual input process requires that the installer either key the system identifiers (each of which can be up to thirty-two characters long) into the system before traveling to the customer's home or call the main office of the system provider from the customer's home and verbally convey the set top box identifiers so that another employee can key them in. This not only increases the time required to provision the set-top box, but introduces more opportunities for human error and subsequent rework during the provisioning process.

SUMMARY OF THE INVENTION

Accordingly, in one aspect, a method for providing video services is disclosed, comprising: connecting a set top box to a video services network and powering on the set top box, the video services network including a residential gateway, a video operational support system and a middleware server; the residential gateway supplying an internet protocol address to the set top box; the set top box transmitting a video service request to a video operational support system within the video services network; the video operational support system authenticating the set top box via the internet protocol address, determining the user account associated with the set top box, and determining the authorized video services associated with the user account; the video operational support system transmitting authorization of provisioning of the authorized video services associated with the user account to the middleware server; and the middleware server transmitting client software to the set top box and loading the client software on the set top box, the client software representing the authorized video services associated with the user account.

In another aspect, a method for providing video services is disclosed, comprising: applying an application programming interface to a set top box to enable communication between the set top box and a middleware server; connecting a set top box to a video services network and powering on the set top box, the video services network including a middleware server; the set top box transmitting a video service request to the middleware server within the video services network; the middleware server determining the authorized video services associated with the user account; and the middleware server transmitting client software to the set top box via the application programming interface and loading the client software on the set top box, the client software representing the authorized video services associated with the user account.

According to another aspect, a video services system is disclosed, comprising: a set top box configured to be operatively coupled to a television; a video services network configured for providing video services to the television via the set top box, wherein the video services network includes a residential gateway operatively coupled to the set top box, a video operational support system operable to communicate with the set top box, and a middleware server operable to communicate with the video operational support system and the set top box; wherein the residential gateway is operable to supply an internet protocol address to the set top box, wherein set top box is operable to transmit a video service request to a video operational support system, wherein the video operational support system is operable to authenticate the set top box via the internet protocol address, determine the user account associated with the set top box, and determine the authorized video services associated with the user account, wherein the video operational support system is operable to transmit authorization of provisioning of the authorized video services associated with the user account to the middleware server, and where the middleware server is operable to transmit client software to the set top box and loading the client software on the set top box, the client software representing the authorized video services associated with the user account.

DETAILED DESCRIPTION OF THE PREFERRED EMBODIMENTS

Figure 1:
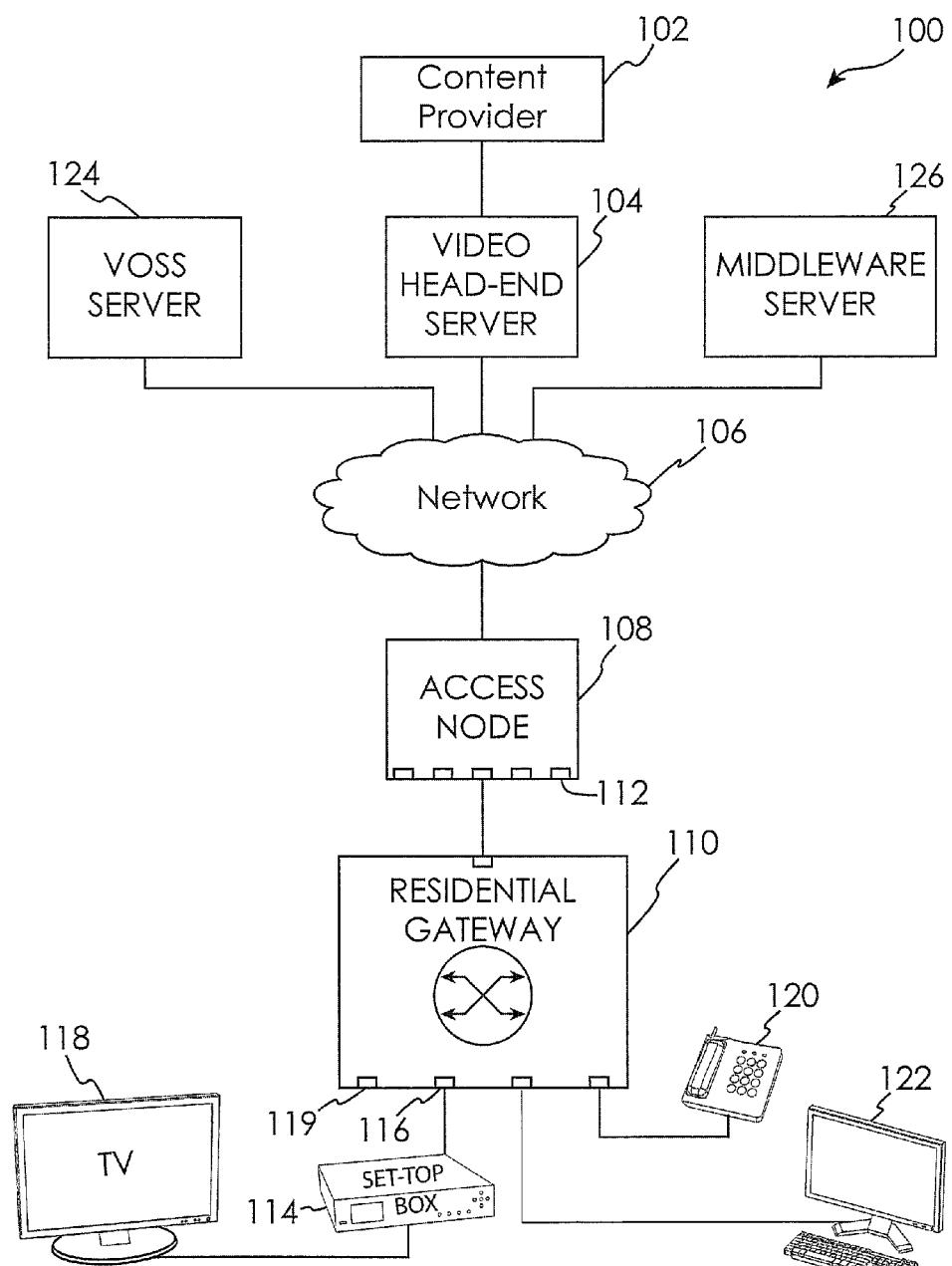
FIG. 1 is an illustration of an exemplary system configured to automatically provision a set top box and provide IPTV services to a customer according to one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

FIG. 1 is an illustration of an exemplary system 100 configured to allow auto-provisioning of set top boxes and provide IPTV services to network subscribers in accordance with the principles of the present disclosure. As shown, a content provider 102 is communicatively connected to a video head-end server 104. Video head-end server 104 is used to store video content delivered, transferred and/or uploaded to it from content provider 102. The video head-end server 104 is also capable of delivering video content over a network 106, such as the internet or public/private packet switched network (PSN), for example. The video head-end server 104 delivers video content via the network 106 to a middleware server 126, which then passes the video content to an access node 108. The access node 108 operates to connect subscribers to the network 106, host video streams/internet group management protocol (IGMP), and provide Ethernet transport of the video content. In certain embodiments, access node 108 may be implemented as a digital subscriber line access multiplexer (DSLAM) which acts as a multiplexer for separating out various broadcast and unicast data streams for a group of subscribers connected to the access node 108. A residential gateway 110 is operatively connected to one of the ports 112 of the access node108 to send and receive data to and from the access node 108. The residential gateway 110 is typically installed in the customer's home with the access node 108 being installed in a facility outside of the customer's home wherein a single access node 108 feeds multiple homes.

A set top box (STB) 114 is operatively connected to a port 116 on the residential gateway 110. The television 118 is connected to and receives video signals from the STB 114. Each residential gateway 110 may be connected to multiple customer devices including, but not limited to, telephones 120, personal computers 122, and set top boxes 114. The individual ports 116 on the residential gateway 110 may be configured in a variety of physical formats, including, but not limited to, Ethernet, coaxial cable (HPNA), and universal serial bus (USB), to suit the type of device being connected and/or the type of existing in-home wiring. For example, if the residential gateway 110 is located close to the set top box 114, a standard Ethernet cable may be used to connect the set top box 114 to the residential gateway 110. However, if the set top box 114 is located in a different room than the residential gateway 110, the existing in-wall coaxial or twisted pair cabling may be used to connect the two devices using the Home Phoneline Networking Alliance (HPNA) or Multimedia Over Coax Alliance (MOCA) protocols. HPNA and MOCA are protocols that allow various networking protocols such as Ethernet to be delivered over legacy wiring systems such as RG-6 coaxial or standard phone line cables.

In a preferred embodiment, residential gateway 114 is implemented as a packet routing device having the ability to perform Layer 3 network address translation (NAT) when sending or receiving IP packet data to or from the access node 108. The residential gateway 110 is therefore able to "hide" the media access control (MAC) addresses of the individual customer devices connected to the residential gateway 110 from other systems connected to the network 106, providing increased security to the individual customer. In certain embodiments, a virtual private LAN service (VPLS) may be used to establish the connection between the video head-end server 104 and the residential gateway 110. For example, the VPLS service can provide a single VLAN to each residential gateway 110. Each VLAN contains all of the data services (i.e., IPTV, VoIP phone, internet) being sent to a single residential gateway 110. To preserve bandwidth, a single VLAN may also be used to deliver all of the broadcast TV channels being sent to the access node 108, with the access node 108 distributing the individual channels to each residential gateway based on the individual customer access plans.

In order to administer the access of the various services to individual subscribers, a video operational support system (VOSS) server 124 is operatively connected to the access node 108 via network 106. The VOSS server 124 maintains a database which keeps track of which services an individual customer has subscribed to and may optionally contain sensitive customer information. In addition, the middleware server 126 is operatively connected to the access node 108 via network 106 and maintains a separate database and other software for managing video content delivery including MPEG4 video, video-on-demand (VOD) and pay-per-view to the customers. In certain embodiments, the middleware server 126 only has access to the data needed to determine if a particular residential gateway (based on some form of device identifier or GUID) is authorized for video service and does not have access to other sensitive customer information (such as social security numbers, addresses, etc.) on the VOSS server 124. The video head-end server 104 is configured to provide requested video channels to the set top box 114 via middleware server 126, access node 108 and residential gateway 110. It shall be understood that the functionality of the middleware server 126 may be incorporated into the video head-end server 104 or vice versa. It shall be further understood that the middleware server 126, the video head-end server 104, and/or the VOSS server 124 may be located in the same physical location (i.e., a video head-end office (VHO)) or in separate locations from one another.

Each of the set top box 114, the residential gateway 110, the access node 108, the VOSS server 124, the video head-end server 104, and/or the middleware server 126 may include a processing unit, memory, storage, and input/output devices. The processing units may be formed of various processors which execute software, such as one or more PENTIUM or DUAL-CORE processors supplied by INTEL Corporation of 2200 Mission College Boulevard, Santa Clara, Calif. 95052, USA. The software, depending on the system functionality, may be configured to store and (i) manage information, such as video content, (ii) manage routing of video streams, and/or (iii) manage interaction with an end-user to download video content and images for display on a television 118.

Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Network 106 can be in the form of a wireless or wired Local Area Network (LAN), Municipal Area Network (MAN), Wide Area Network (WAN), such as the internet, a combination of these, or such other network arrangement as would occur to those skilled in the art. Within network 106, additional devices, such as routers, servers, or other computing devices may be included to achieve the transmission of data between the customer and provider equipment. In addition, the various components, such as middleware server 126 and video head-end server 104, may be connected using various sub-networks, such as a LAN, within or in addition to network 106. For example, video head-end server 104 may be connected directly to middleware server 126, with middleware server 126 acting as a gatekeeper and providing the actual video signals to the access node 108.

When an installer arrives at a customer premises to install new service, both the residential gateway 110 and the set top box 114 must be provisioned by the system 100. Various methods are known in the art for provisioning residential gateways, the details of which are not important to the present disclosure. For example, if the residential gateway 110 has been manufactured to be compliant with the TR-069 standard provisioning protocol, the residential gateway 110 will automatically be recognized by the access node 108. The access node 108 will then forward the provisioning request with a unique identifier, such as the MAC address of the residential gateway, to the VOSS server 124. The VOSS server 124 then determines whether the residential gateway 110 is authorized for use.

Figure 2:
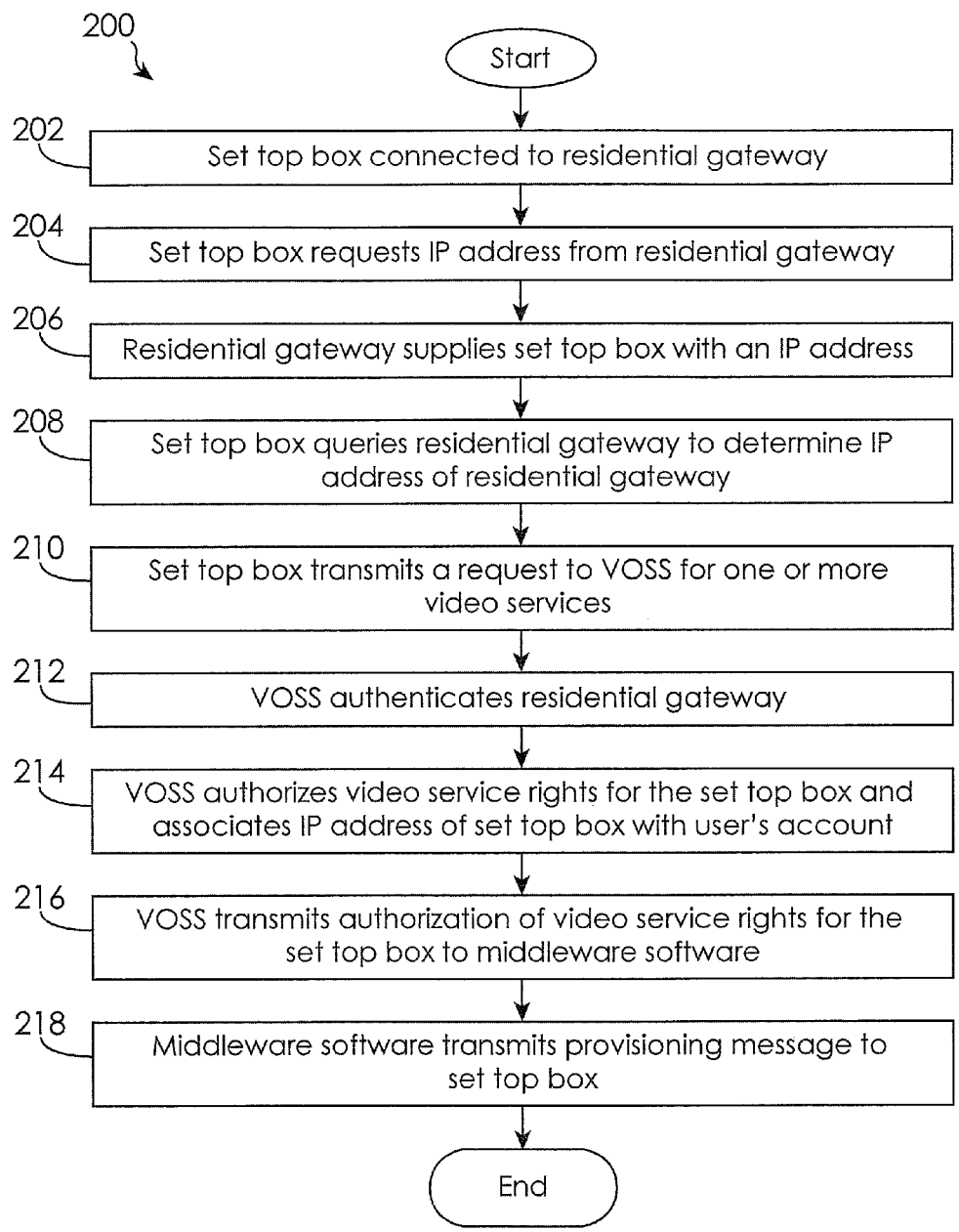
FIG. 2 is a flow chart describing a process of automatically discovering and provisioning a set top box according to one embodiment of the present disclosure.

Once the residential gateway 110 has been authorized, each of the set top boxes 114 must be discovered and provisioned by the system before IPTV content can be delivered to the set top boxes 114. FIG. 2 is a flow chart of an exemplary process 200 for automatically discovering and provisioning a set top box 114 according to one embodiment of the present disclosure. The process 200 starts at step 202, where the user connects the set top box 114 to the residential gateway 110. The set top box 114 is pre-loaded with an application-layer (Layer 7 of the standard OSI model) software boot program which communicates with the residential gateway 110 upon being connected. The set top box 114 requests an IP address from the residential gateway 110 at step 204. At step 206, the residential gateway 110 supplies the set top box 114 with an IP address. In a preferred embodiment, the IP address supplied to the set top box 114 by the residential gateway 110 is a private IP address. The supplied IP address is typically generated by the residential gateway using a Dynamic Host Control Protocol (DHCP) program. The residential gateway may also work in conjunction with additional servers and protocols to manage and assign the IP address to the set top box 114. For example, Remote Authentication Dial In User Service (RADIUS) with Authentication, Authorization and Accounting (AAA) management, may be implemented within the network path to provide greater security for the data.

After being assigned its own IP address, the set top box 114 queries the residential gateway 110 to determine the IP address and/or MAC address of the residential gateway 110 at step 208. The set top box 114 then bundles the identifying information for both the residential gateway 110 and the set top box 114 into a provisioning request and sends the request to the VOSS server 124 via the residential gateway 110 at step 210. The identifying information for the residential gateway 110 may include the IP address, the MAC address, and/or the software GUID of the residential gateway 110. The identifying information for the set top box 114 may include the IP address, the MAC address, and/or the software GUID of the set top box 114. In certain embodiments, the residential gateway 110 performs network address translation on the provisioning request packets so that the MAC address of the set top box 114 is hidden from other devices within the network 106 until the packets are reassembled and their application layer payloads (containing the residential gateway and set top box identifiers) are decrypted and read by the VOSS server 124.

At step 212, the VOSS server 124 uses the identifying information contained in the provisioning request to determine whether the customer is authorized to receive video services. In one embodiment, the VOSS server 124 looks up the IP address and/or MAC address of the residential gateway 110 in a relational database containing a list of authorized devices. If the customer is authorized to receive video services, the identifying information (IP address, MAC address and/or software GUID) of the set top box 114 is added to a list of authorized set top boxes for the customer's account at step 214. If the customer is not authorized to receive video services, the VOSS server 124 instructs the set top box 114 to display a message on the television 118 stating that the customer is not currently authorized to receive video service.

If the set top box 114 has been authorized for service (step 214), the VOSS server 124 transmits an authorization of video rights for the set top box 114 to the middleware server 126 at step 216. The middleware server 126 then updates its database records to show that the particular set top box 114 is authorized for video service over the particular residential gateway 110. At step 218, the middleware server 126 downloads video client software, in addition to a digital rights management (DRM) encryption key, to the set top box 114, enabling the set top box 114 to request and receive video content from the middleware server 126. In a preferred embodiment, the middleware server 126 acts as a gatekeeper by receiving video content from the video head-end server 104 and providing the content to the set top box 114. In other embodiments, the video head-end server may provide video content to the set top box 114, with the DRM keys and other security filters being first loaded onto the set top box 114 from the middleware server 126.

The set top box 114 is now able to request video service using any of the ports 116 on the residential gateway 110. For example, if the user disconnects the set top box 114 from one port 116 on the residential gateway 110 and reconnects it to a different port 119 on the residential gateway 110, the middleware server 126 will still recognize that the newly connected set top box 114 is authorized for video service on the residential gateway 110 based on the MAC address and/or GUID of the set top box 114 and will respond to video service requests from the set top box 114. In other words, the set top box 114 does not have to be re-provisioned if it is moved from one room to another in the customer's home. However, if the set top box 114 is taken to another customer's home and plugged into a different residential gateway 110, the middleware server 126 will recognize that the MAC address and/or GUID of the set top box 114 is not associated with the MAC address and/or GUID of the new residential gateway 110 in the database and will therefore deny the video content request.

Figure 3:
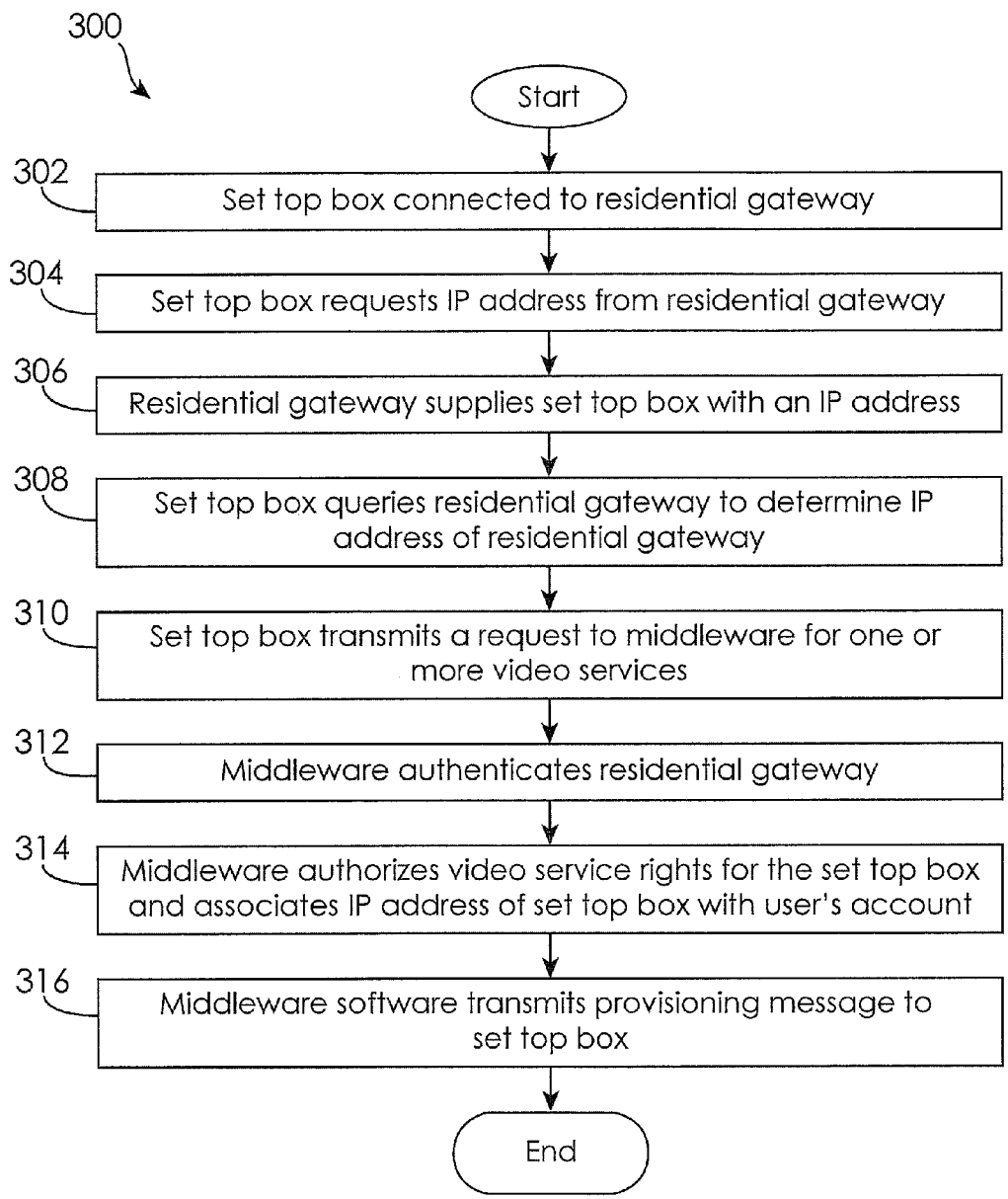
FIG. 3 is a flow chart describing a process of automatically discovering and provisioning a set top box according to another embodiment of the present disclosure.

FIG. 3 is a flow chart of an exemplary process 300 for automatically discovering and provisioning a set top box 114 according to a further embodiment of the present disclosure. The process 300 is similar to process 200, with the exception that the VOSS is not required. Rather, the set top box 114 sends the provisioning request directly to the middleware server 126 which then communicates with the VOSS server 124 to verify the customer video subscription information. This embodiment may require that the set top box 114 contain additional software, such as a specialized application programming interface (API) for communicating with the middleware 126.

The process 300 begins at step 302 with the set top box 114 being connected to the residential gateway. Again, the set top box requests an IP address from the residential gateway 110 at step 304 and the residential gateway 110 supplies an IP address to the set top box 114 at step 306. At step 308, the set top box 114 queries the residential gateway 110 to determine the IP address of the residential gateway 110. At step 310, the set top box 114 sends a provisioning request to the middleware server 126, with the identification information of the set top box 114 and residential gateway 110 included in the request payload. The middleware server 126 then authenticates the residential gateway 110 at step 312 and communicates with the VOSS server 124 to determine whether the customer is authorized to receive video services. If the customer is authorized to receive video services, the middleware server 126 authorizes video service for the set top box 114 and associates the IP address and/or MAC address of the set top box with the user's account at step 314. Lastly, at step 316, the middleware downloads a provisioning message along with the required video client software and DRM encryption keys to the set top box 114.

Once the set top box 114 has been provisioned, it may request video content (i.e., a particular video channel) by sending an internet group management protocol (IGMP) join request to the middleware server 126. In IPTV, video channels have an assigned IP address that the IGMP protocol software in the middleware server 126 knows and delivers to the requesting device (in this case, the set top box 114). After receiving the IGMP join request, the middleware server 126 sends a request for a particular video channel to the video head-end server 104. It shall be understood that the middleware server 126 may already be receiving the particular video channel or may need to send a request to the video head-end server 104 to acquire the desired video content. Once the middleware server 126 receives the video content from the video head-end server 104, it passes the content to the set top box 114. The DRM encryption keys used by the middleware server 126 and video head-end server 104 ensure that unauthorized users are not able to send a rogue IGMP join request to receive video content. It shall be appreciated by those of ordinary skill in the art that other protocols for requesting and delivering IPTV channels may also be utilized and are considered to be within the scope of the present disclosure.

Although the principles of the present disclosure have been described in association with set top boxes, it should be understood that the set top box functionality may be incorporated into a television or digital video recorder (DVR) and use the principles of the present disclosure in the same or similar manner.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:
    connecting a set top box to a video services network and powering on the set top box, the video services network including a residential gateway, a video operational support system and a middleware server;
    the residential gateway supplying an internet protocol address to the set top box;
    the set top box transmitting a video service request to the video operational support system within the video services network, wherein the video service request comprises information for the gateway and the set top box;
    the video operational support system authenticating the set top box based on the information for the gateway and the set top box, determining the user account based on the information for the gateway, and determining the authorized video services associated with the user account, wherein authentication information is stored in the video operational support system, and wherein information for the set top box is added to a list of authorized set top boxes associated with the user account;
    the video operational support system transmitting, in response to determining that the user account is authorized to receive video services, authorization of provisioning of the authorized video services associated with the user account to the middleware server; and
    the middleware server transmitting client software to the set top box and loading the client software on the set top box, the client software representing the authorized video services associated with the user account.

2. The method of claim 1, further comprising, after transmitting and loading the client software, the middleware server conveying video content to the set top box.

3. The method of claim 1, further comprising the set top box requesting an internet protocol address from the residential gateway.

4. The method of claim 1, further comprising the video operational support system associating the internet protocol address with the user account associated with the set top box.

5. The method of claim 1, further comprising the residential gateway supplying a private internet protocol address to the set top box.

6. The method of claim 1, further comprising the residential gateway supplying a globally unique identifier to the set top box.

7. The method of claim 1, wherein the video operational support system occurs on at least one device positioned remotely from the set top box.

8. The method of claim 1, wherein the video services network is arranged to configure the set top box for operation automatically without human intervention other than the connecting and powering of the set top box.

9. The method of claim 1, wherein the residential gateway includes a modem component and a router component.

10. The method of claim 1, wherein the middleware server is positioned remotely from the set top box, the residential gateway, and the video operational support system.

11. A method, comprising:
applying an application programming interface to a set top box to enable communication between the set top box and a middleware server;
connecting a set top box to a video services network and powering on the set top box, the video services network including the middleware server;
the set top box transmitting a video service request to the middleware server within the video services network, wherein the video service request comprises information for the gateway and the set top box;
the middleware server determining the authorized video services associated with the user account based on the information for the gateway and the set top box through communicating with a video operational support system, wherein authentication information is stored in the video operational support system, and wherein information for the set top box is added to a list of authorized set top boxes associated with the user account; and
the middleware server transmitting client software to the set top box via the application programming interface and loading the client software on the set top box, the client software representing the authorized video services associated with the user account.

12. The method of claim 11, further comprising a residential gateway supplying an internet protocol address to the set top box, wherein the residential gateway is a component of the video services network.

13. The method of claim 12, further comprising the set top box requesting an internet protocol address from the residential gateway.

14. The method of claim 11, further comprising the middleware server authenticating the set top box and authorizing video services for the set top box.

15. The method of claim 11, further comprising, after transmitting and loading the client software, the middleware server conveying video content to the set top box.

16. The method of claim 11, wherein the video services network is arranged to configure the set top box for operation automatically without human intervention other than the connecting and powering of the set top box.

17. A video services system, comprising:
a set top box configured to be operatively coupled to a television;
a video services network configured for providing video services to the television via the set top box, wherein the video services network includes a residential gateway operatively coupled to the set top box, a video operational support system operable to communicate with the set top box, and a middleware server operable to communicate with the video operational support system and the set top box;
wherein the residential gateway is operable to supply an internet protocol address to the set top box, wherein set top box is operable to transmit a video service request to a video operational support system, wherein the video service request comprises information for the gateway and the set top box, wherein the video operational support system is operable to authenticate the set top box based on the information for the gateway and the set top box, determine the user account based on the information for the gateway, and determine the authorized video services associated with the user account, wherein authentication information is stored in the video operational support system, wherein information for the set top box is added to a list of authorized set top boxes associated with the user account, wherein the video operational support system is operable to transmit authorization of provisioning of the authorized video services associated with the user account to the middleware server, and wherein the middleware server is operable to transmit client software to the set top box and load the client software on the set top box, the client software representing the authorized video services associated with the user account.

18. The system of claim 17, wherein the middleware server is operable to convey video to the set top box after the client software is transmitted and loaded.

19. The system of claim 17, wherein the video services network is arranged to configure the set top box for operation automatically without human intervention other than the connecting and powering of the set top box.

20. The system of claim 17, wherein the set top box is operable to request an internet protocol address from the residential gateway.

* * * * *